United States Patent Office 3,439,108
Patented Apr. 15, 1969

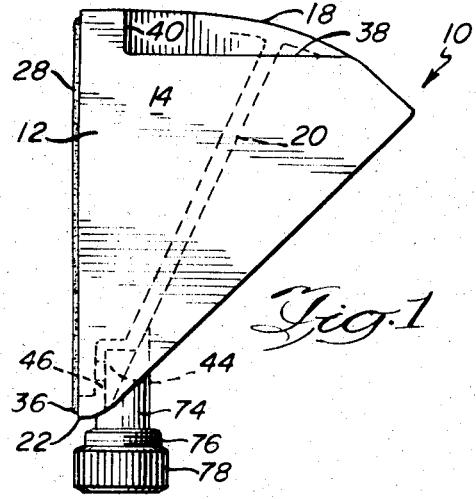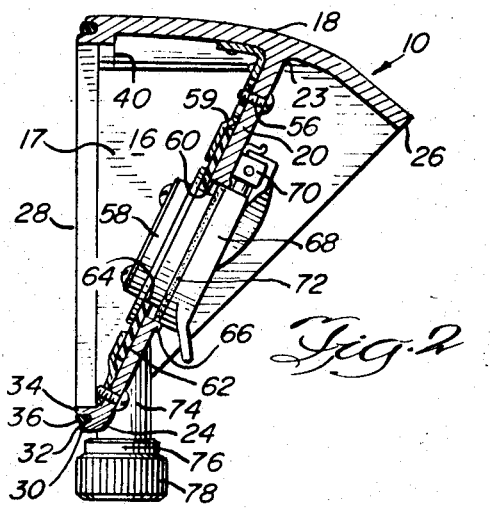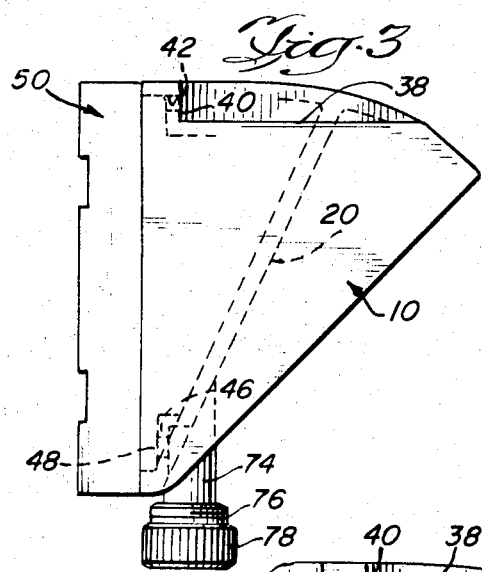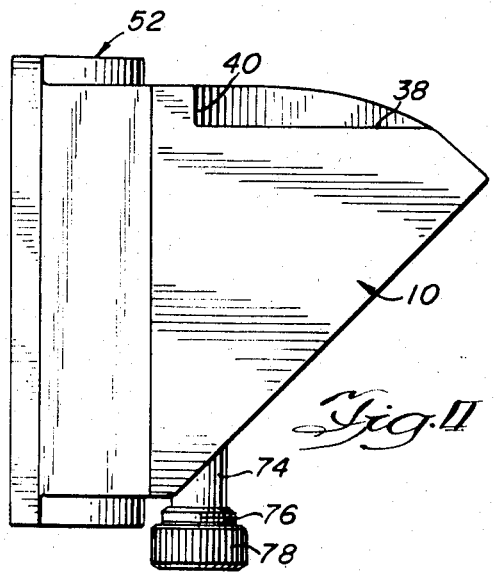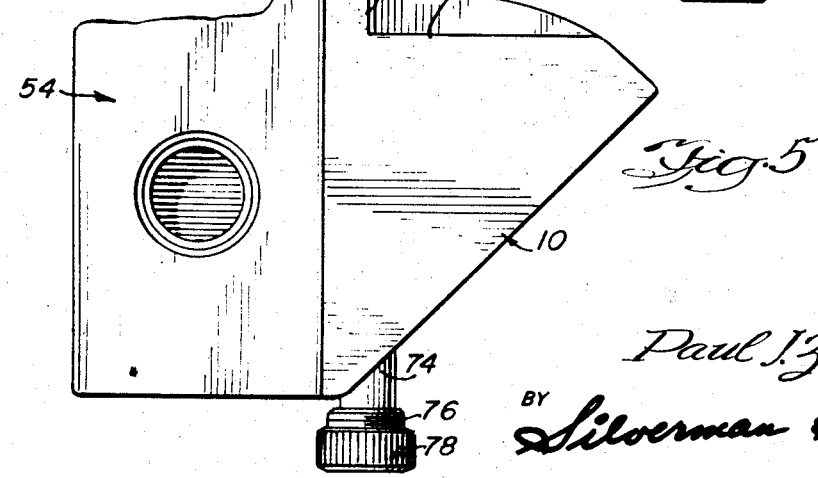

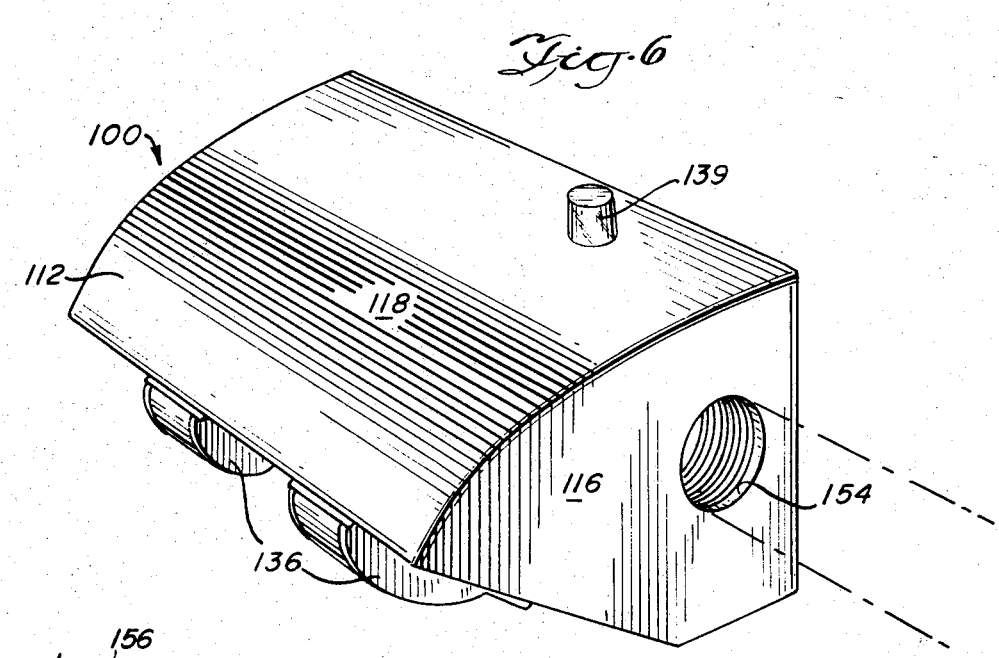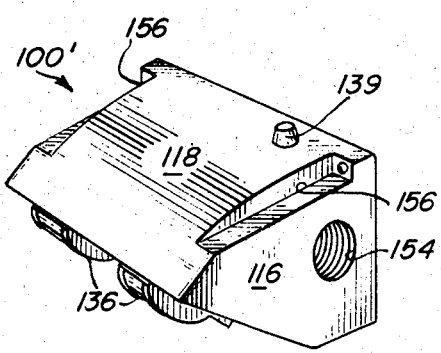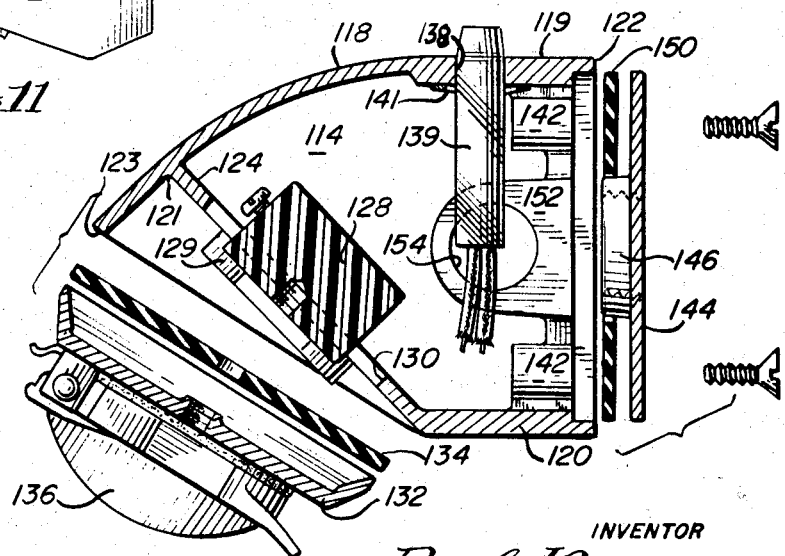

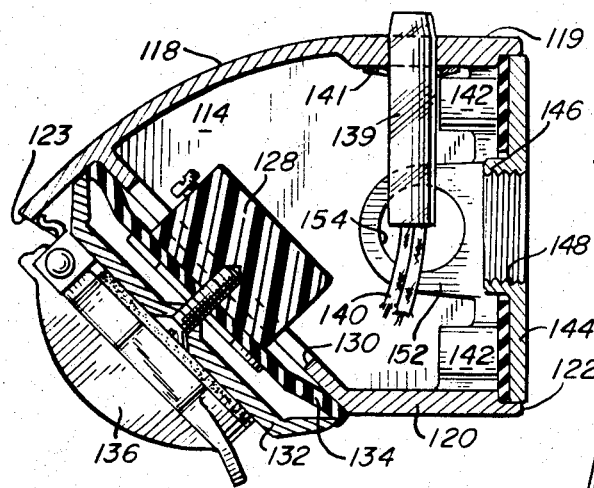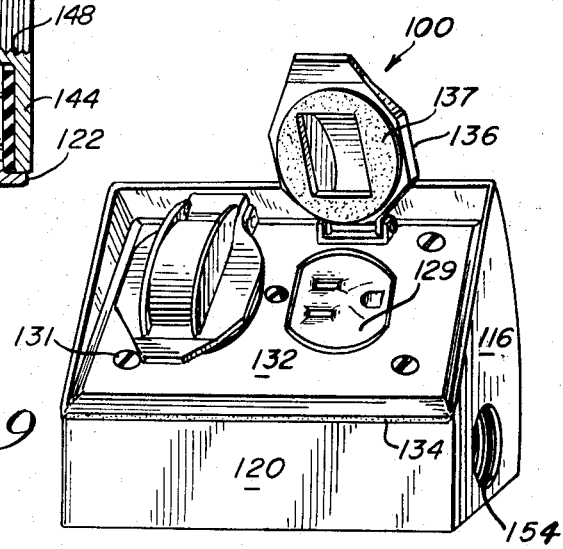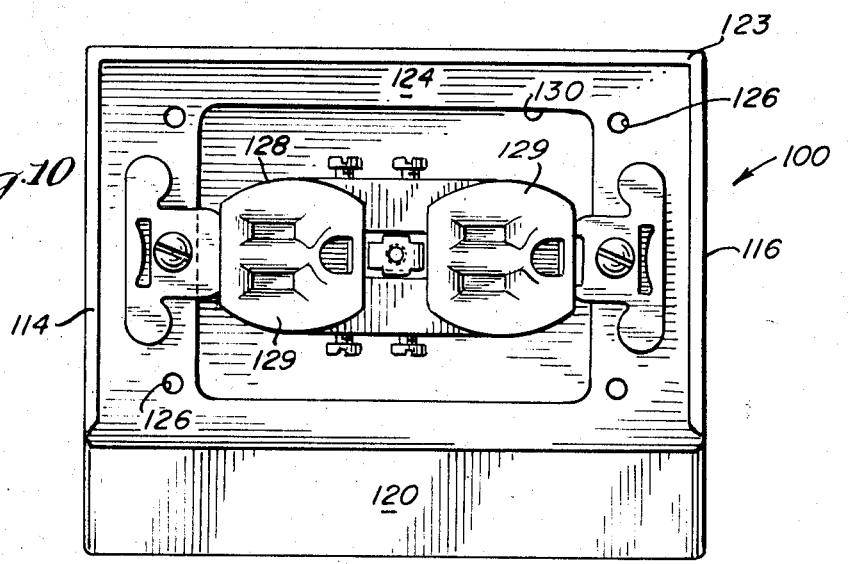

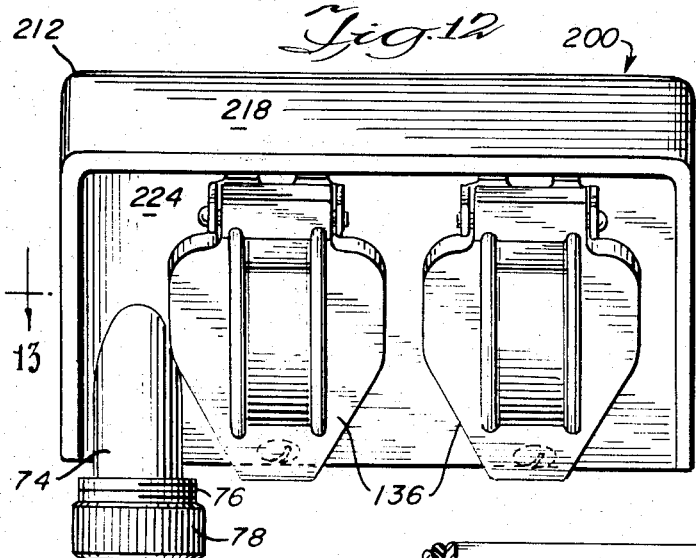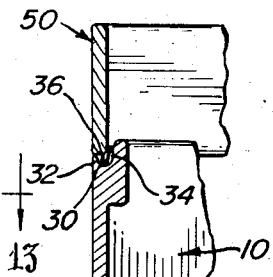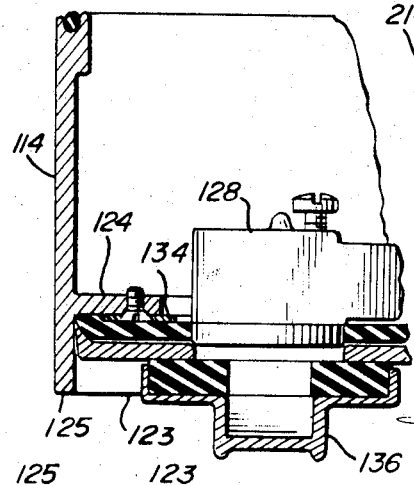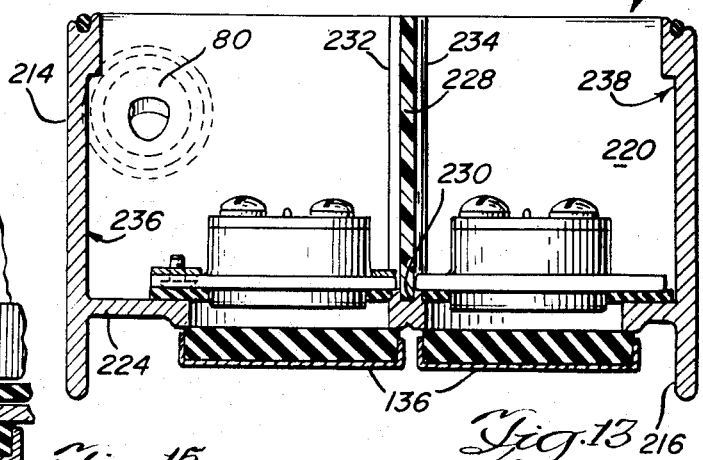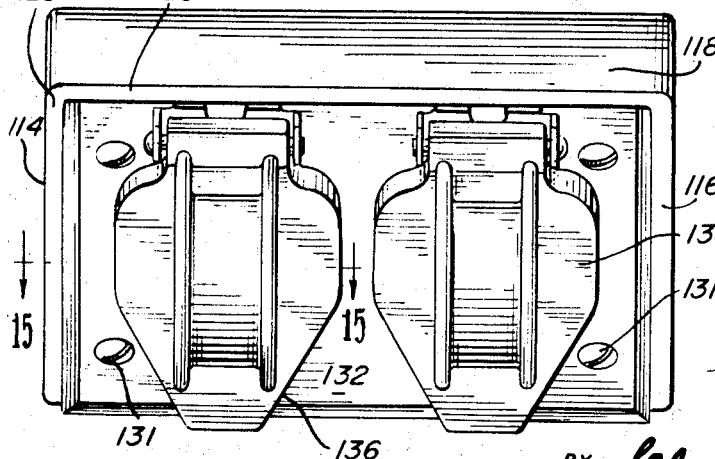

3,439,108
HOODED WEATHERPROOF EXTENSION ADAPTER
AND JUNCTION BOX CONSTRUCTION
Paul J. Zerwes, Chicago, Ill., assignor to Bell Electric
Company, Chicago, Ill., a corporation of Illinois
Filed July 25, 1966, Ser. No. 567,461
Int. Cl. H01r 13/46; H01h 9/02, 13/04
U.S. Cl. 174—53
17 Claims

ABSTRACT OF THE DISCLOSURE

A weatherproof electrical junction box adapter and/or electrical junction box per se comprising a single casting having a hollow chambered body defined by congruent side walls, closed off top and bottom walls and a planar inclined recessed front wall, the top and side walls defining a canopy-like hood shielding the front wall, the front wall having means for mounting an electrical appliance thereto and a passageway to accommodate such appliance. Embodiments wherein the side, top and bottom walls are rearwardly extended to define a junction box per se are described. Also, the front wall may have an open-ended conduit formed integral therewith for mounting a cap and a compression gland thereon for specialized electrical lead-in uses.

This invention relates generally to so-called electrical junction boxes and more particularly, provides an improved universal type weatherproof electrical junction box having a novel hooded extension adapter secured thereto and/or formed integral therewith for shielding the exterior electrical connection made to the appliance or receptacle housed in said box against exterior environmental conditions.

Structures oridinarily referred to as electrical junction boxes commonly are utilized to accommodate therein electrical wiring devices, outlet receptacles, toggle switches, telephone jacks and the like. Modern outdoor living trends have created considerable demand for truly weatherproofed junction box installations for outdoor use, say at poolside, patios and gardens, garages and other installation areas for providing conveniences, such as electrical outlets for lighting, outdoor cooking, etc.; for warning systems; for telephone extensions and many other equally popular purposes. Because of the climatic conditions to which an outdoor installation may be exposed, it is necessary that such installations be protected from direct exposure of the electrical connection to precipitation. Thus, a truly weatherproofed installation should be provided. Industry and insurance underwriters' standards regarding weatherproofed installations must be complied with in order to have an installation designated as truly weatherproof. Heretofore, such installations have been unduly expensive. Thus, in today's general usage, true weatherproofing has been sacrificed to economic acceptability. One simply had to be satisfied with less than a truly weatherproofed junction box installation simply because it was not economically feasible to fabricate the many separate, often single-purpose, parts required, including the plurality of sealing members for the plurality of junctures requiring sealing.

One important requirement for weatherproofing a junction box installation is the shielding of the electrical connection made thereto from direct exposure to precipitation. Hood structures are available for attachment to known boxes but provide less than the desired protection. In order to provide proper shielding the hood must extend at least 45° relative to vertical orientation. At this angle, access to the receptacle or outlet for making the electrical connection desired is almost impossible. Moreover, the weatherproof cap protectors or covers over the electrical receptacle could not be lifted sufficiently to permit the desired connection to be effected. Thus, one not only has to provide sufficient shielding for the connection when it is made but also, must provide for access to the receptacle in order to make the desired electrical connection. The shielding also should be adequate to protect not only from overhead precipitaation but also should protect against side-driven precipitation. Separate hoods heretofore available were either too expensive or offered less than adequate protection to the electrical connection. Often, because of the use of many separate parts, a plurality of joints were required to be sealed, said joints often serving as possible leakage paths for moisture.

Another contributing factor leading to the high cost of available though less than truly weatherproofed installations is found in a number of separate parts required. Not only are these separate parts relatively expensive to fabricate, they are also relatively expensive to assemble and to install. Such parts usually are match-mated for use semble and to install. Such parts usually are match-mated with other matched parts and hence, no satisfactory system of mass fabrication and standardized inventory was possible. The loss or misplacement of one of the many separate parts could well mean the entire replacement of the remaining parts. Since the structures normally are sold in kit form, an entirely new kit well may be required. Thus, it is desirable to use a minimum number of separately fabricated elements and preferably, to provide a structure which may be a unitary, integral one.

Many prior hood structures adapted for utilization as shielding means for junction box installations failed to consider or provide means for mounting of the electrical receptacle, etc. The junction box to which the shielding means was attached had its front wall vertically arranged. As stated above with the shield in place, substantial difficulty was encountered in making the electrical connection to the appliance housed in the junction box. Further, it is often desirable for the weatherproofed exterior installation to be taken off an already existing junction box and hence, the necessity for an extension construction which is intended to have the electrical appliance secured to it rather than to the existing junction box. Extension devices are known but none have been provided with shielding means and further, none have had means for mounting the appliance at an angle relative the vertical orientation so as to afford better access to the connection as well as protect against direct frontal exposure to precipitation.

There are many types of housings utilized for electrical appliances such as outlet receptacles, etc. According to prior teachings, it would be necessary to fabricate a specific independent shield structure with use with each type of electrical housing. Economically, it is desirable to provide a standardized hood structure equally capable of installation upon any weather-proof type electrical housing of the same width. In order not to be confused about terminology, one should note that the term "gang" is used in this art to denote a wall plate having a specific height and width measurement. A standard one gang wall plate is 4½″ x 2¾″. Additional number of gangs change the width of the wall plate but do not change the 4½" height measurement. Even if a wall plate such as a one gang wall plate is horizontally arranged, it is still considered a one gang plate. One of the dimensions is always 4½" regardless of the number of "gangs." The weatherproofed installation also may include an extension adapter for attachment to any known junction box, say of the "gem" or "handee" types, or well may be attached only to a base plate itself directly secured to a wall. Desirably, the preferred hood structure should be capable equally of attachment to each type of electrical housing structure mentioned so that it is in effect, universal in application.

The available shielding devices for junction boxes normally are fabricated by stamping processes requiring expensive dies and resulting in substantial scrap waste during fabrication. It is desirable also that a shielding structure be capable of being fabricated by casting techniques, avoiding scrap and such expensive dies. Molds used in casting techniques are easily and inexpensively varied for specific constructional differences, say for particular purposes. Any such change, if normal stamping dies are used, is expensive and often requires new dies.

Accordingly, it is the principal object of this invention to provide a truly weatherproofed hooded extension adapter for installation upon an electrical junction box or housing, which adapter substantially eliminates the disadvantages of prior junction box shielding structures as enumerated hereinabove.

Another object of this invention is to provide a truly weatherproofed hooded extension adapter of the character described which carries means for mounting of an electrical applicance thereto instead of to a junction box, said means being inclined from vertical orientation sufficiently to provide access to said appliance for making of the electrical connection, but none-the-less, also for protecting the appliance and any connection made thereto against precipitation sufficiently for the installation to be designated and accepted as truly weatherproofed according to industrial and insurance underwriting standards.

Another object of this invention is to provide a truly weatherproofed hooded extension adapter of the character described which is integral with the junction box structure so that the entire installation may be formed as a single unit by casting techniques.

A further object of this invention is to provide the structure as described immediately above with means for mounting of an electrical appliance thereto.

A still further object of this invention is to provide a structure as described in the last two paragraphs with partition means whereby the installation can be divided into independent compartments physically and electrically isolated one from the other so that both high voltage and low voltage devices may be incorporated and installed in the same junction box installation.

Another object of this invention is to provide a truly weatherproofed hooded junction box construction as well as a truly weatherproofed hooded junction box extension adapter structure wherein the conventional cover plate member is not required; the said construction as well as the extension structure incorporating an integral wall functioning in lieu of a conventional cover plate member.

A still further object of this invention is to provide a truly weatherproofed hooded extension adapter as well as a truly weatherproofed junction box construction having novel recessed portions to enable facile attachment of the construction or structure to the wall and/or base plate and/or existing junction box or extension adapter.

An additional object of this invention is to provide, in a junction box construction as well as in an extension adapter structure, a cable lead-in means integral with said construction and/or adapter structure, said lead-in means capable of receiving a compression gland therein.

Other objects and advantages of this invention will become evident as several exemplary embodiments thereof are described in detail with reference to the accompanying drawings.

In the drawings:

FIG. 1 is a side elevational view of a hooded extension adapter construction in accordance with the invention and arranged in the orientation assumed when installed.

FIG. 2 is a side elevational view similar to that of FIG. 1 but with portions broken away to show the interior construction.

FIG. 3 is a side elevational view of the extension adapter of FIG. 1 illustrated installed on a baseplate.

FIG. 4 is a side elevational view of the extension adapter of FIG. 1 illustrated installed on a junction box extension structure.

FIG. 5 is a side elevational view of the extension adapter of FIG. 1 illustrated installed on a weatherproof junction box, portions of which are broken away.

FIG. 6 is a perspective view of a one gang horizontally oriented weatherproof junction box incorporating, integral therewith, the hooded extension adapter constructed in accordance with the invention.

FIG. 7 is an exploded vertical medial section taken through the junction box of FIG. 6.

FIG. 8 is a vertical medial section taken through the junction box of FIG. 6.

FIG. 9 is a bottom perspective view illustrating the junction box construction of FIG. 6 and further showing the snap cover of one outlet receptacle opened so as to provide access to said receptacle.

FIG. 10 is a bottom plan view of the junction box construction illustrated in FIG. 6 but with the coverplate and sealing gasket removed.

FIG. 11 is a reduced perspective view of a modified embodiment of the invention.

FIG. 12 is a front view of another embodiment of the invention.

FIG. 13 is a sectional view taken along lines 13—13 of FIG. 12 and in the direction indicated.

FIG. 14 is a front view of the junction box construction illustrated in FIG. 6.

FIG. 15 is a fragmentary section taken along lines 15—15 of FIG. 14 and in the direction indicated.

FIG. 16 is a fragmentary detail shown in section of the installation illustrated in FIG. 3 showing the sealing means between the baseplate and the novel extension adapter.

Referring now to the drawings, in FIG. 1 there is illustrated a one-gang vertically oriented hooded extension adapter constructed in accordance with the invention and generally designated by reference character 10 and shown in the orientation assumed when installed.

The hooded extension adapter 10 comprises a rearwardly opening unitarily cast hollow chambered body 12 defined by a pair of congruent parallel side walls 14 and 16, a downwardly outwardly sloping top wall 18, an inclined or canted front wall 20 and a narrow bottom wall 22. It should be understood that the bottom wall 22 be so narrow as to only constitute an edge. The side walls 14 and 16 are somewhat pie-shaped in configuration, the apex thereof being coextensive with the sides of the bottom planar wall 22. The front wall 20 is inclined about 45° from vertical in installed condition of the adapter 10, being flush with the bottom wall 22 at the front edge 24 thereof and being recessed, at its upper edge 23, inwardly of the front edge 26 of the top wall 18. The forward edges of side walls 14 and 16 occupy a plane inclined relative vertical at an angle greater than the angle of inclination of the front wall 18. Thus, there is defined a canopy-like enclosure extending outwardly of the front wall 20. The rear peripheral edge 28 of body 12 is provided with a groove 30 defined by an outer portion 32 and an inner lip 34 defining a seat for a ring-like sealing gasket 36 having a circular cross section in its uncompressed stage. The interior chamber 17 as defined in body 12 may be described as having front and rear faces thereof converging downwardly.

A pair of elongate recesses 38 are formed along the side edges of top wall 18 and terminate at a pair of flat corner webs 40. These webs are provided each with a threaded passageway 42. The front wall 20 is provided with a pair of recesses 44 adjacent the lower opposite corners thereof and closely adjacent edge 24 of bottom wall 22. These recesses 44 each have a web 46 forming the base thereof and threaded passageways 48 identical to passageways 42 are provided therein. Both passageways 42 and 48 are intended to accommodate fastening means such as screws and the like to enable attachment of the hooded extension adapter 10 to say, a baseplate 50, as shown in FIG. 3; a junction box extension adapter structure 52 such as shown in FIG. 4; or to a weatherproof junction box 54 as shown in FIG. 5.

Suitable threaded openings 56 are formed in the canted front wall 20 to permit attachment of an electrical appliance or receptacle 58 thereto. Appliance 58, of course, is disposed within the interior of the body 12. A suitable opening 60 also is formed in wall 20 to provide access to the receptacle 58. A gasket 62 having an opening 64, slightly smaller than the opening 60, is interposed between the mounting tongue 59 of appliance 58 and the wall 20. Openings 60 and 64 are, of course, aligned. In this manner, the interior of body 12 is sealed from the exterior of wall 20. The opening 60 is surrounded by a raised edge 66 and a spring-biased snap cover 68 is provided. Said cover 68 is pivotally connected to a bracket 70 which is fastened to wall 20 at a location chosen so that the snap cover 68 covers the opening 60. The snap cover 68 has a gasket 72 which seals the receptacle 58 from the exterior of wall 20 when the snap cover is in place.

In the embodiments of the invention shown in FIGS. 1–5 inclusive as well as in FIGS. 11 and 12, a hollow open-ended conduit 74 is formed integral with wall 20 and arranged to extend in a vertical orientation parallel to the rear edge 28 of body 12. The outermost end 76 of said conduit 74 has a thickened portion which is adapted to be threaded to receive a cap 78. A compression gland 80 (FIG. 13) is inserted through the outer open end of conduit 74 so that when, say, a telephone cable, for example, is fitted through the gland 80, tightening of cap 78 will compress the gland 80 and seal the entry to the interior of body 12. Although compression glands of this type are well known, a housing therefor integral with a junction box heretofore has not been provided.

When the fastening means, such as screws, are tightened to secure the hooded extension adapter 10, say to the baseplate 50 as illustrated in FIG. 3, the peripheral outer edges of baseplate 50 and edge 32 of the extension adapter abut while the gasket 36 is compressed between the lip 34 and the inner peripheral edge of the baseplate 50 thereby to form a weatherproof seal (FIG. 16). This type of seal has been found to be most efficient.

Directing attention now to FIG. 6, a modified embodiment of the invention is illustrated comprising a one gang horizontally oriented hooded junction box generally designated by reference character 100. Here, the hooded extension adapter according to the invention such as shown in FIGS. 1–5 inclusive would have the hood horizontally arranged and is formed integral with a boxlike structure which functions as a junction box per se. Therefore box 100 is a complete junction box having threaded lead-in openings such as shown at reference character 154 whereby to accommodate the ordinary standardized conduit carrying electrical leads therein.

Junction box 100 is defined by a body 112 having opposite sidewalls 114 and 116, an arcuate top wall 118 and a bottom wall 120. The body 112 opens rearwardly along rear edge 122. The arcuate top wall 118 has a portion 119 thereof substantially parallel to the planar bottom wall 120 and the remaining forward portion of wall 118 has an arcuate upwardly convex configuration sloping downward to extend outward to a point along a plane taken at an angle greater than 45° relative to vertical in installed condition of the box 100.

A planar front wall 124 is provided integral with walls 114 and 116, 118 and 120. The front wall 124 is inclined at about a 45° angle relative vertical but in all instances is recessed at its upper edge 121 from the outer edge 123 of the top wall 118. The outer or forward edges 125 of the congruent side walls are inclined at an angle greater than the angle of inclination of the front wall so that the forwardly extending portions of the sidewalls and top wall form a canopy-like enclosure or shield surrounding the front wall along three sides thereof.

The front wall 124 is provided with a plurality of suitable, standard size threaded openings 126 which serve to enable the attachment of an electrical receptacle such as double plug-in outlet 128 to the wall 124. A large opening 130, here of rectangular configuration, is provided spaced from the edges of wall 124 so as to accommodate the body of any electrical appliance or receptacle. In this construction, the front wall 124 may well be described as a continuous flange formation arranged in a plane normal to walls 114 and 116. Here the body of the receptacle 128 is disposed entirely within the body 112 with the facing portions 129 thereof extending slightly forwardly of the wall 124. A cover plate 132 is secured to the wall 124 by means of fastening means such as screws 131 accommodated in certain ones of the threaded openings 126. Interposed between the cover plate 132 and the wall 124 is a suitably apertured rectangular gasket 134. A pivotally secured, spring-biased snap cover 136 is provided suitably fastened on the coverplate 132 at desired locations and is gasketed, 137, properly to seal the faces 129 of the appliance 128 from exterior of box 100.

Provision is made by means of aperture 138 formed in top wall 118 to accommodate a pilot lamp arrangement 139 having leads 140 for connection in the receptacle circuit. One viewing the junction box 100 from a distance would be able to ascertain whether or not the electrical connection intended to be made is actually made and/or is in operation. The pilot lamp arrangement is secured in place by ordinary lock washers 141 as shown in FIG. 7.

Suitable posts 142 are formed interior of body 112 at locations non-interferent with the receptacle 128 or the electrical leads leading thereto. Suitable threaded openings are provided in said posts 142 so as to permit a rear plate 144 to be secured to cover the open rear portion of body 112. Plate 144 may be provided with an abutment 146 carrying a threaded passageway 148 so that an electrical conduit can be led into the box 100 from the rear thereof so as to enable electrical leads to be introduced into the box 100 through the rear portion thereof. A suitably apertured gasket 150 is interposed between the body 112 and plate 144 to seal the rear of box 100 in a weatherproof connection. Opposed abutments 152 having threaded or tapped openings 154 are formed on the interior of walls 114 and 116 to accommodate conventional electrical conduit so that electrical conductors may be introduced into the box 100 through the sidewalls thereof. Suitably threaded plugs (not shown) may be introduced into those of passageways 154 which are not used.

In FIG. 11, a hooded junction box identical in almost every respect to the box 100 is illustrated. The only difference between box 100 and the box 100′ illustrated in FIG. 11 is that recesses 156 are formed along opposite side edges of the top wall thereof and are identical in configuration and function to recesses 38 formed in the extension adapter of FIG. 1.

In FIG. 12, a further embodiment of the invention is illustrated in the form of a weatherproof one gang horizontally oriented hooded junction box generally designated by reference character 200. Junction box 200 has a body 212 similar in most respects to body 112 of box 100. However, in box 200, the front wall 224 is provided with openings 226 each of which is of a size and configuration solely required to provide access to a particular receptacle outlet face or switch. Whereas wall 124 of box 100 can be called a horizontal partition arrangement, wall 224 would be considered an integral front wall similar in all respects to the wall 20 of extension adapter 10. Of course, only threaded passageways required for attachment of the electrical appliance to wall 224 need be provided and said wall functions in lieu of a conventional cover plate. A compression gland-holding conduit 74 is provided integral with wall 224 and is identical to those structures shown in FIGS. 1–5.

Another major difference between the junction box 200 and the junction box 100 constructions is that a partition 228 is provided and arranged slidably to be received in interior opening groove 230 defined by a pair of spaced ribs 232 and 234 formed in the interior facing sides of walls 224 and the top and bottom wall 218 and 220 of junction box 200. The partition 228 has a perimetric configuration similar to that of the sidewall of body 212 so as to divide the interior body 212 into a pair of compartments, isolated one from the other. In FIG. 13, the low voltage compartment 236 which in this instance carries a telephone jack, is isolated from the high voltage compartment 238 which carries a high voltage electrical outlet. Suitable snap covers 136 also are provided on wall 224 of junction box 200 for the same purposes and functions as heretofore described.

Each of these structures 10, 100, 100′ and 200 is formed as an integral structure preferably by casting techniques. Only slight changes in the mold is required to provide say box 100 from a mold intended to provide box 200. Likewise the hooded extension adapters can equally be provided with horizontally arranged hoods and the same type of partition structure as found in junction box 200. Likewise the front wall 20 of the extension adapter 10 may well be formed similar to wall 124 of junction box 100, so that a coverplate can be utilized if desired.

It should be understood that the hood extends forwardly at an angle of greater than the 45° inclination of the appliance holding wall and in this manner generally enables access to the receptacle or other appliance without interference by the hood but as well provides a shielded structure. Here then is a junction box installation which can be according to all present standards considered a weatherproofed installation.

Many minor changes in the size and configuration of structures made in accordance with the invention will occur to the skilled artisan without departing from the spirit and scope of the invention as defined in the appended claims.

I claim:

1. An extension adapter construction for weatherproofing an electrical junction box installation comprising a single casting having a hollow chambered body defined by a pair of congruent parallel side walls, closed off top and bottom walls of unequal dimension, and a planar front wall, said front wall being inclined relative to said bottom wall and being recessed at its upper end relative to the edge of the top wall, said top wall being sloped outwardly and downwardly at its forward portion to define with the forward extending portions of said side walls a canopy-like structure shielding the front wall from the top and sides, said front wall having means for securing an electrical appliance thereto and a passageway to accommodate said appliance, said body being formed as a casting.

2. The construction as claimed in claim 1 in which the inclination of the front wall is about 45° of vertical.

3. The construction as claimed in claim 1 in which said passageway is rectangular in configuration and spaced from the periphery of said front wall to define a continuous flange formation arranged in a plane normal to the side walls.

4. The construction as claimed in claim 1 in which means are provided on said front wall to secure a conventional weatherproof coverplate thereon with a suitable gasket therebetween.

5. The construction as claimed in claim 1 in which a hollow open-ended conduit is formed integral with said front wall, said conduit having a thickened outer end portion.

6. The construction as claimed in claim 5 and a cap mounted on said end portion and a compression gland received through said open end, said gland adapted to be compressed upon tightening of the cap.

7. The construction as claimed in claim 1 in which a junction box is formed unitary therewith.

8. The construction as claimed in claim 7 in which said top wall is downwardly arcuate in configuration and extends forwardly of said inclined front wall and said side walls are co-extensive with said top wall, the angle at which the front edges of said side walls extend being greater than the angle of inclination of said front wall.

9. The construction as claimed in claim 1 in which said top wall has a portion thereof having the configuration of an arcuate upwardly convex plane, which portion extends forwardly of said inclined front wall, and the angle at which the front edges of said side walls extend being greater than the angle of inclination of said front wall.

10. The construction as claimed in claim 9 in which said body has a rearwardly extending rectangular portion unitary therewith, and conduit receiving means are provided in selected walls thereof to pass electrical leads into said body.

11. The construction as claimed in claim 10 in which partition means is provided to define at least a pair of physically and electrically isolated compartments, each adapted to house an electrical appliance.

12. The construction as claimed in claim 10 and a compression gland holding conduit formed integral with said front wall.

13. The construction as claimed in claim 9 and a compression gland holding conduit formed integral with said front wall.

14. An electrical junction box of the weatherproof type comprising a unitary casting having side, and front walls and closed off top and bottom walls to define a hollow housing for receiving an electrical appliance therein, said casting having a front face defined by said front wall and including means for sealing the front face, means at the front wall enabling selective access to the appliance for making of an electrical connection thereto, at least one wall being provided with a tapped boss on the interior of said wall but opening through said wall to accommodate the passage of electrical conductors; said top wall having a sloped forward portion of upwardly convex configuration, said front wall being inclined outwardly of the bottom wall and recessed from the surrounding forward edges of said and top walls, whereby a canopy-like enclosure is defined extending forwardly of the front wall, and means on the front wall of said housing for mounting the electrical appliance thereto.

15. The structure as claimed in claim 14 in which partition means is provided interior of said housing for dividng same into at least two isolated compartments.

16. The structure as claimed in claim 14 in which groove means is provided on the inner facing surfaces of said walls parallel with the side walls of said box and partition means seated within said groove means for separating the interior of said box into isolated compartments.

17. The structure as claimed in claim 14 in which the front wall is inclined at an angle of substantially 45° relative the vertical and the canopy-like enclosure extends outwardly of said front wall at an angle greater than 45°.

References Cited

UNITED STATES PATENTS

| | | | |
|---|---|---|---|
| 1,284,291 | 11/1918 | Fort | 174—81 X |
| 1,890,050 | 12/1932 | Fullman | 174—81 X |
| 1,979,804 | 11/1934 | Lutz. | |
| 2,865,981 | 12/1958 | Budnick | 174—81 |
| 2,881,240 | 4/1959 | Seif | 174—53 X |
| 2,985,334 | 5/1961 | Slater | 220—24.3 |

FOREIGN PATENTS

| | | |
|---|---|---|
| 38,529 | 3/1931 | France. |
| 511,584 | 10/1930 | Germany. |

LARAMIE E. ASKIN, *Primary Examiner.*

U.S. Cl. X.R.

174—65, 81